United States Patent [19]

Hogan et al.

[11] Patent Number: 5,184,299
[45] Date of Patent: Feb. 2, 1993

[54] ANTILOCK BRAKE SYSTEM MOTOR SPEED CONTROL

[75] Inventors: Martin A. Hogan, Northville; Kevin G. Leppek, Troy, both of Mich.; Peter J. Spadafora, Howald, Luxembourg

[73] Assignees: General Motors Corporation, Detroit, Mich.; Delco Electronics Corporation, Kokomo, Ind.

[21] Appl. No.: 531,397

[22] Filed: May 31, 1990

[51] Int. Cl.$^5$ ............................................. B60T 8/64
[52] U.S. Cl. ............................... 364/426.02; 303/95; 303/103; 303/104
[58] Field of Search .............. 364/426.02, 426.01, 364/426.03; 303/100, 102, 95, 115 EC, 103, 94, 104; 188/181 R, 162, 72.1; 180/197

[56] References Cited

U.S. PATENT DOCUMENTS

| | | | |
|---|---|---|---|
| Re. 33,557 | 3/1991 | Kade et al. | 303/100 |
| 4,761,741 | 8/1988 | Argawal et al. | 364/426.02 |
| 4,783,127 | 11/1988 | Kade et al. | 303/100 |
| 4,807,134 | 8/1988 | Agarwal et al. | 364/426.02 |
| 4,816,726 | 9/1988 | Novis et al. | 318/293 |
| 4,835,695 | 5/1989 | Walenty et al. | 364/426.02 |
| 4,850,457 | 7/1989 | Taig | 188/72.1 |
| 4,876,650 | 10/1989 | Kubo | 364/426.02 |
| 4,881,784 | 11/1989 | Leppek | 303/100 |
| 4,917,445 | 4/1990 | Leppek et al. | 303/100 |
| 4,991,103 | 2/1991 | Lin | 364/426.02 |
| 4,997,237 | 3/1991 | Ricker et al. | 303/115 EC |
| 5,014,202 | 5/1991 | Thatcher | 364/426.03 |
| 5,071,199 | 12/1991 | Spadafora et al. | 303/100 |
| 5,080,447 | 1/1992 | Leppek et al. | 303/100 |
| 5,134,352 | 7/1992 | Matsumoto et al. | 364/426.02 X |

Primary Examiner—Parshotam S. Lall
Assistant Examiner—Thomas S. Auchterlonie
Attorney, Agent, or Firm—Howard N. Conkey

[57] ABSTRACT

A motor speed controller for an antilock brake system motor driven brake pressure modulator controls the speed during the pressure ramping phase of an antilock brake pressure control cycle by commanding periods of dynamic braking of the motor while the motor current is being controlled to ramp the pressure.

8 Claims, 4 Drawing Sheets

ANTILOCK BRAKE SYSTEM MOTOR SPEED CONTROL

BACKGROUND OF THE INVENTION

This invention relates to an antilock control method for vehicle wheel brakes.

When the brakes of a vehicle are applied, a braking force is generated between the wheel and the road surface that is dependent upon various parameters which include the road surface condition and the amount of slip between the wheel and the road surface. This braking force increases as slip increases until a critical value of slip is surpassed. Beyond the critical value of slip, the braking force decreases and the wheel rapidly approaches lockup. Therefore, to achieve stable braking, an antilock control system seeks to operate wheel slip at or near the critical slip value. An antilock control system achieves this objective by detecting an incipient lock condition. Upon detecting an incipient lock condition, the antilock control system releases pressure at the wheel brake to allow recovery from the incipient lock condition. Once the wheel recovers from the incipient lock condition, brake pressure is reapplied. Criteria used to indicate an incipient lock condition includes excessive wheel deceleration and/or excessive wheel slip.

One known antilock control system uses a motor driven pressure modulator in which a DC torque motor drives a piston in a cylinder whose volume is modulated to control the hydraulic brake pressure at the wheel brake. In this system, because of the relationship between motor current, motor torque and motor load represented by the hydraulic brake pressure on the head of the piston, the value of motor current is used as a representation of brake pressure and is controlled to provide control of the brake pressure. In general, when an incipient wheel lock condition is sensed, the value of motor current at this time is stored as a representation of the brake pressure producing the maximum braking force coexisting with the critical slip between the wheel and the road surface and the motor current is controlled to quickly retract the piston to release brake pressure to allow recovery from the incipient wheel lock condition. When a recovery from the incipient wheel lock condition is sensed, the motor current is controlled to extend the piston to reapply brake pressure. In reapplying the brake pressure, the pressure is quickly established substantially at the brake pressure producing the maximum braking force by quickly establishing the motor current at a significant fraction of the motor current stored at the time an incipient wheel lock condition was sensed. Thereafter, brake pressure is ramped at a controlled rate that is a function of wheel slip and acceleration by ramping the motor current until an incipient wheel lock condition is again sensed after which the cycle is repeated. In general, the ramp rate is decreased with increasing wheel slip and wheel deceleration so that the ramp rate is smaller as the wheel approaches an incipient wheel lock condition. This lower ramp rate prevents an overshoot of the brake pressure resulting from system inertia when an incipient wheel lock condition is sensed.

In the foregoing form of motor driven pressure modulator, the following dynamic relationships exist: (a) when the brake pressure load on the motor is equal to the motor torque, the motor does not rotate, the piston remains stationary, and motor current is a measure of the brake pressure and (b) when the brake pressure load on the motor is small compared to the motor torque, the motor accelerates and rotates at a high rate and the piston travels at a high speed. In this latter situation, the speed of the motor is unknown and the motor current is not a true indicator of brake pressure. If this condition exists when the wheel slip approaches the critical slip, the high motor/piston speed may cause the brake pressure to overshoot the pressure producing the critical slip and will result in storing a current when an incipient wheel lock condition is sensed that represents a brake pressure other than the pressure producing the maximum braking force.

Excessive speed resulting in the brake pressure overshooting the pressure producing the critical slip may also occur when the ramp rate of the motor current is decreased in response to increasing slip and/or deceleration as the wheel slip approaches the critical slip value. At the time the current ramp rate is decreased, the motor speed is related to the prior higher ramp rate and the motor current is not a true measure of the actual pressure. If the critical wheel slip is reached soon after a decrease in the current ramp rate, the excessive motor speed may result in the brake pressure overshooting the pressure producing the critical slip and in the storing of a current representing a brake pressure other than the pressure producing the maximum braking force.

Another characteristic of the foregoing form of motor driven pressure modulator is that its compliance varies with load on the piston. When the motor load is low (i.e., low pressure present on the piston head), the motor position change necessary to create a change in pressure is greater compared to the motor position change required to produce a change in pressure when the motor load is high (i.e., piston head pressure high). Thus, for a given motor current ramp rate during application of brake pressure, the real motor speed will actually be higher at lower pressures than it will be at higher pressures. When beginning a pressure reapply from a low pressure value, if motor torque is allowed to increase at a very high rate, the motor travels at an effective speed higher than is actually desired, which may cause the system to overshoot the desired pressure.

Thus from the foregoing, it can be seen that when controlling motor current to control re-application of brake pressure following recovery from an incipient wheel lock condition, it is desirable to provide controlled movement of the motor such that the motor does not exhibit an overspeed condition.

SUMMARY OF THE INVENTION

In general, this invention provides for limiting the speed of the motor of a motor driven pressure modulator of an antilock braking system. This is accomplished by commanding periods of dynamic braking during the re-application of pressure to limit periods of motor acceleration and to prevent the motor speed from becoming excessive.

In order to prevent excessive motor speeds when the ramp rate is shifted to a lower rate as the wheel approaches the critical slip, the amount of braking is increased with the decrease in the ramp rate to quickly slow the motor speed to the new slower ramp level and to thereafter inhibit excessive motor speeds.

The dynamic braking is also provided to linearize the pressure ramp for a given ramp rate. This is accomplished by providing an amount of motor braking that is inverse to the magnitude of the motor current. This results in lower braking forces at high currents and higher braking forces at lower currents to compensate for the variation in the compliance of the motor driven pressure modulator.

In a specific form of the invention, the motor braking is provided by applying a zero current command of the motor in the reverse direction. The amount of this dynamic braking is adjusted by varying the duration of the brake period.

DESCRIPTION OF THE DRAWINGS

The invention may be best understood by reference to the following description of the preferred embodiment of the invention and the drawings in which.

DESCRIPTION OF THE PREFERRED EMBODIMENT

Figure 1:
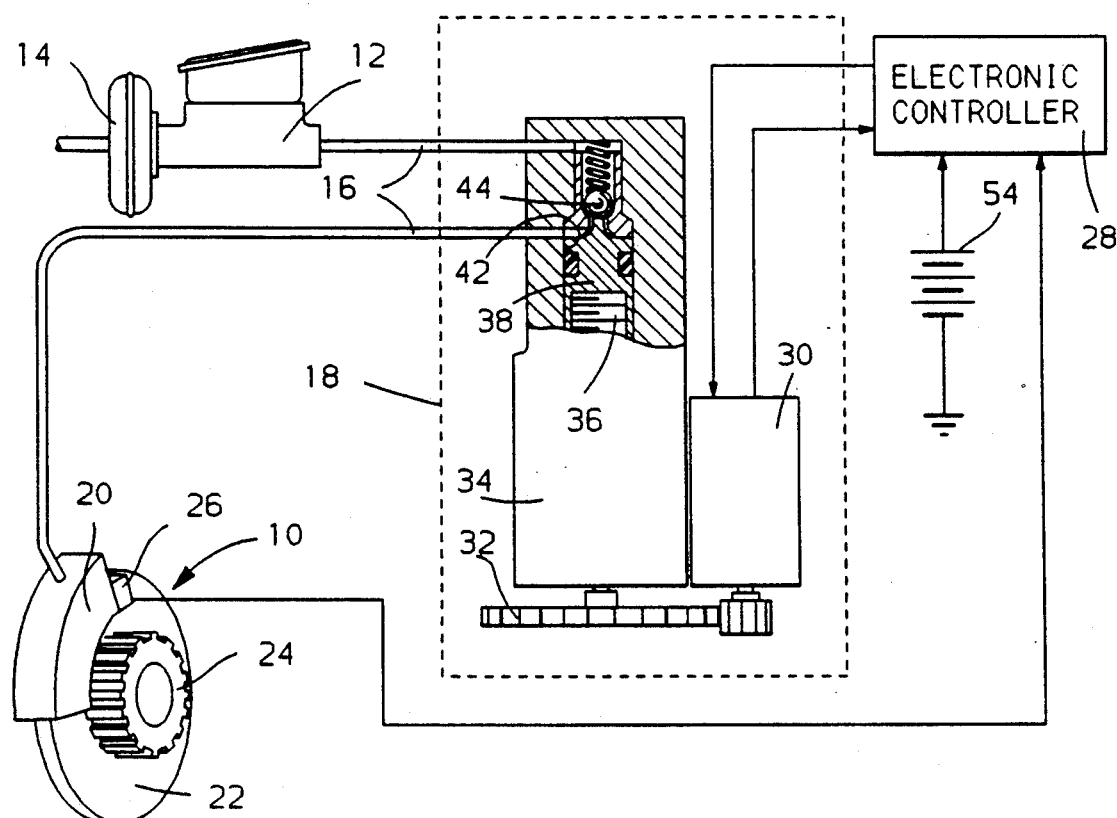
FIG. 1 is a diagram of a wheel braking system including a motor driven pressure modulator for limiting the wheel brake pressure for antilock brake control.

A wheel lock control system for a wheel of a motor vehicle is illustrated in FIG. 1. In general, the wheel includes a brake unit 10 operated by hydraulic pressure provided by a master cylinder 12 and a hydraulic boost unit 14 operated by the vehicle operator. The hydraulic fluid under pressure from the master cylinder 12 is provided to the brake unit 10 via brake lines 16 and a pressure modulator 18. The brake unit 10 is illustrated as a disk brake system that includes a caliper 20 located at a rotor 22. The wheel includes a wheel speed sensing assembly comprised of an exciter ring 24 rotated with the wheel and an electromagnetic sensor 26 which monitors the rotation of the exciter ring to provide a signal having a frequency proportional to the speed of the wheel. The wheel speed signal from the sensor 26 is provided to an electronic controller 28.

The pressure modulator 18 is controlled by the electronic controller 28 to limit the brake pressure applied to the wheel brake assembly 10 to prevent wheel lockup. The modulator 18 is illustrated in an inactive position when it is transparent to the braking system. This is the modulator home position during normal vehicle braking. In general, when the controller 28 senses a braking condition whereat the wheel is approaching an incipient wheel lock, the pressure modulator 18 is controlled to regulate the braking pressure to the wheel to maintain the braking of the wheel in a stable braking region. The pressure modulator 18 includes a DC torque motor 30 whose output shaft drives a gear train 32 which, in turn, rotates a linear ball screw actuator 34. The ball screw actuator contains a linearly stationary ball screw which, when rotated, linearly positions a nut 36. A nut 36 terminates in a piston 38 such that as the linear ball screw rotates, the piston 38 is either extended or retracted depending upon the direction of the rotation of the torque motor 30. The modulator 20 includes a housing 40 in which a cylinder 42 is formed. The piston 38 is reciprocally received within the cylinder 42. The cylinder 42 forms a portion of the fluid path between the master cylinder 12 and the wheel break unit 10. Included within this fluid path is a normally closed ball check valve 44 which, when closed, isolates the master cylinder 12 from the wheel brake unit 10. The ball check valve 44 is operated to an open position by the piston 38 when it is positioned in an extended position within the cylinder 42 as illustrated in FIG. 1. This position is the home position of the modulator 18.

When the ball check valve 44 is opened, fluid communication is provided between the master cylinder 12 and the wheel brake unit 10. This position is the normal inactive position of the pressure modulator 18 so that normal braking of the wheel of the vehicle is provided upon actuation of the brakes by the vehicle operator. However, when the torque motor 30 is operated by the electronic controller 28 to modulate the braking pressure in the wheel brake unit 10, the piston 38 is retracted, allowing the ball check valve to seek and isolate the master cylinder 12 from the wheel brake unit 10 as long as the pressure in the cylinder 42 is less than the pressure from the master cylinder 12. Further retraction of the piston 38 functions to increase the volume in the cylinder 42 thereby decreasing the pressure applied to the wheel brake unit 10. By controlling the DC torque motor 30, a pressure at the wheel brake can therefore be modulated to controlled values less than the master cylinder 12 pressure outlook until such time that the piston 38 again unseats the ball check valve 44 or until the pressure generated by the pressure modulator at the wheel brake unit 10 exceeds the fluid pressure output of the master cylinder 12. When this latter condition exists, the ball check valve 44 is opened by the differential fluid pressure which limits the pressure of the wheel brake unit 10 at the master cylinder 12 pressure. In this manner, the wheel cylinder pressure can never exceed the operator established pressure.

Figure 2:
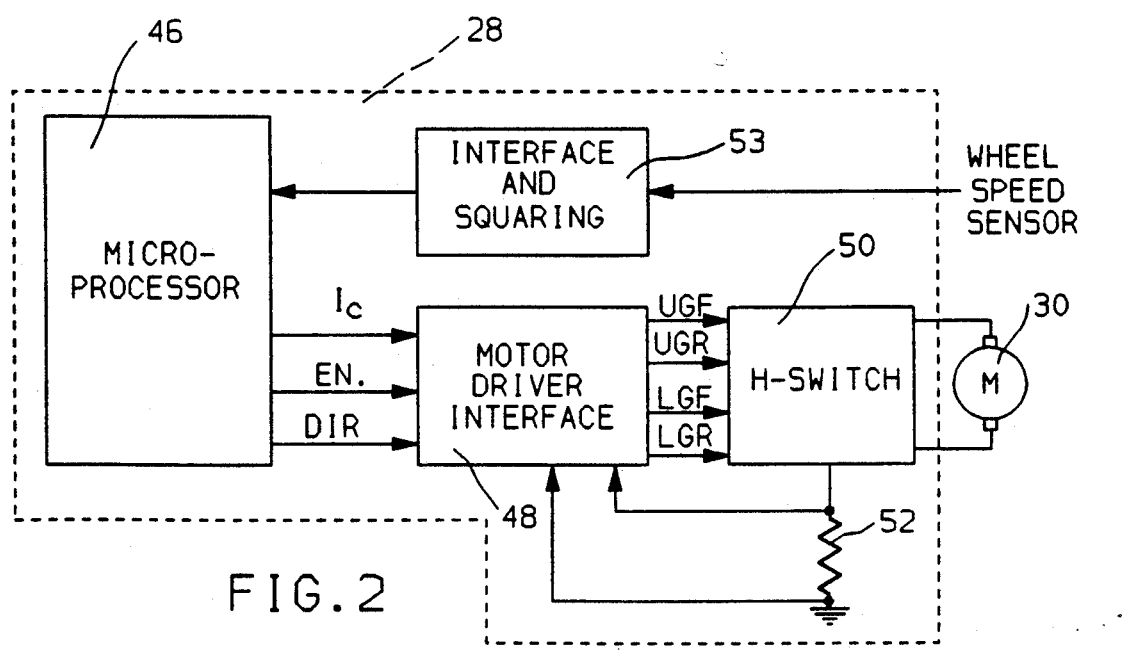
FIG. 2 is a diagram of the electronic controller of FIG. 1 for controlling the current to the motor of the motor driven pressure modulator of FIG. 1.

Referring to FIG. 2, the electronic controller 28 of FIG. 1 is illustrated and generally takes the form of a digital computer based controller. The controller includes a microprocessor 46 that is standard in form and includes the standard elements such as a central processing unit which executes an operating program permanently stored in a read-only memory and which stores tables and constants utilized in controlling the modulator 18, an analog-to-digital converter, a random access memory and input/output circuitry utilized to provide motor control signals to a motor driver interface circuit 48. The input/output circuit further includes input ports for receiving the wheel speed signal from the output of an interface and squaring circuit 53 having an input from the wheel speed sensor 26.

The motor driver interface circuit 48 receives an enable signal, a motor current command signal $I_c$ and a forward/reverse direction signal from the microprocessor 46 and controls an H-switch driver 50 to establish the commanded motor current $I_c$ in the required forward or reverse direction. The current to the torque motor 30 is controlled to the commanded value via a closed loop that responds to the actual motor current represented by the voltage across a sense resistor 52. In response to the direction and motor current command, the motor driver interface 48 energizes the upper and lower forward gates via the upper gate signal UGF and lower gate signal LGF to control the DC torque motor 30 in the forward direction to apply brake pressure and energizes the upper and lower reverse gates via the signals UGR and LGR to control the DC torque motor 30 in the reverse direction to retract the piston 38 to reduce pressure at the wheel brake. The microprocessor 46 may take the form of a Motorola single chip microcomputer MC-68HC11. The motor driver interface 48 and H-switch 50 may take the form of the driver illustrated in the U.S. Pat. No. 4,835,695 issued May 30, 1989.

As previously described, when the speed of the DC torque motor 30 is low as current is controlled in the forward direction to apply pressure to the brakes 20, the motor current is a measure of the torque and therefore the brake pressure. However, when the motor 30 is rotating, the motor current sensed by the resistor 52 is not a true indicator of brake pressure due to the back EMF of the motor 30.

During a typical antilock brake control cycle established by the system of FIGS. 1 and 2, when an incipient wheel lock condition is sensed, the motor current is controlled to quickly retract the piston 38 to release brake pressure to allow recovery from the incipient wheel lock condition. This reversal is accomplished by commanding a reverse motor direction and setting the command current $I_c$ at a reverse current value $I_r$. The motor driver interface 48 responds to these commands by energizing the upper and lower reverse H-switch gate switches to drive the motor 30 in reverse direction at the commanded current level. When recovery from the incipient wheel lock condition is sensed, brake pressure is reapplied and ramped by commanding a forward motor direction and setting the command current $I_c$ at a forward apply current value $I_a$. The motor driver interface responds to these commands by energizing the upper and lower H-switch gate switches to drive the motor in a forward direction at the commanded level. Brake pressure is ramped by ramping the value of the apply current value $I_a$. This ramp function is continued until an incipient wheel lock condition is again sensed after which the cycle is repeated. In general, the ramp rate is decreased with increasing wheel slip and wheel deceleration so that the ramp rate is smaller as the wheel approaches an incipient wheel lockup condition.

Figure 5:
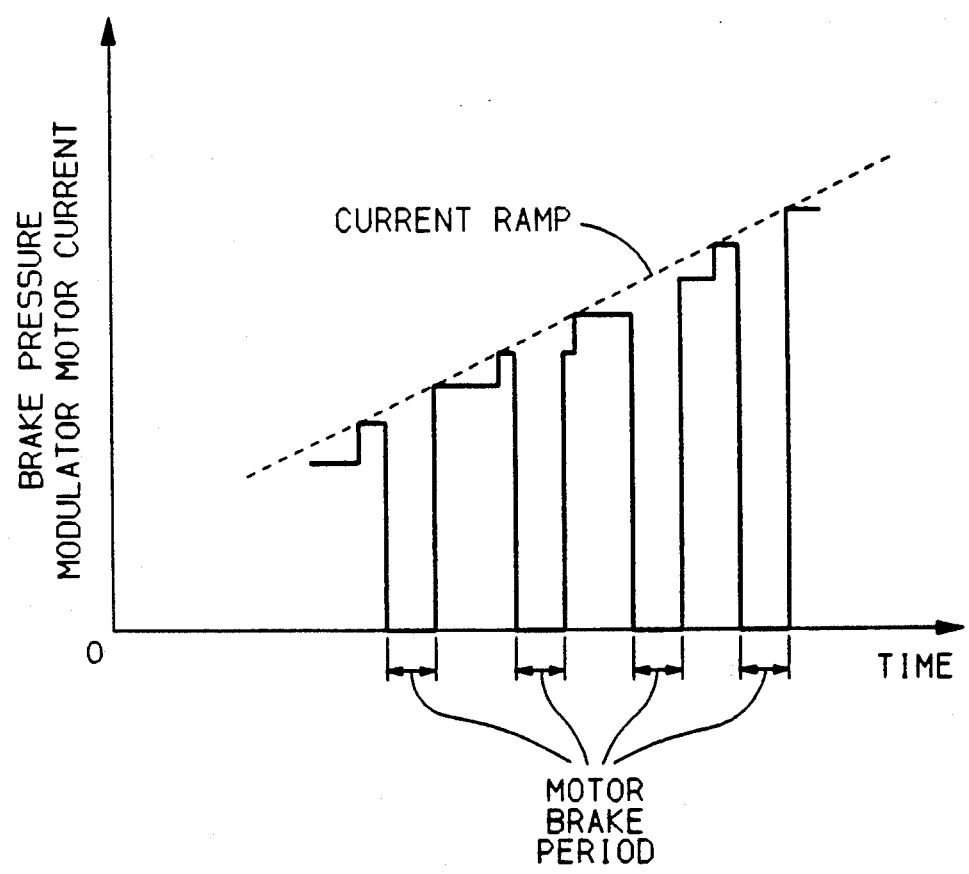
FIG. 5 is a diagram illustrating the control of motor current to provide periodic motor braking in accord with the principles of this invention.

In accord with the principles of this invention, as the current is being ramped to establish a controlled ramp of the pressure applied to the wheel brake, the DC torque motor 30 is repetitively dynamically braked at constant intervals for a specified time period. This braking is provided by enabling the H-switch 50 in a motor reverse direction and commanding a zero current to the DC torque motor 30. This establishes a dynamic braking of the DC motor tending to retard motion of the motor output shaft. The repetitive dynamic braking of the motor 30 as the motor current is ramped to ramp the brake pressure is illustrated in FIG. 5. By this controlled braking, the acceleration periods of the DC torque motor 30 is limited and the motor speed is controlled to relatively low values. This periodic braking assures that the brake pressure does not overshoot the brake pressure producing the maximum braking force when the incipient wheel lockup condition is sensed and assures that the motor current value stored when an incipient wheel lockup condition is sensed substantially represents the brake pressure applied to the wheel brake 20 producing the critical slip. Further, the dynamic braking of the motor 30 is provided so as to substantially linearize the pressure ramp provided by the motor 30 as the current is ramped to ramp the pressure from a low to high value.

Figure 3:
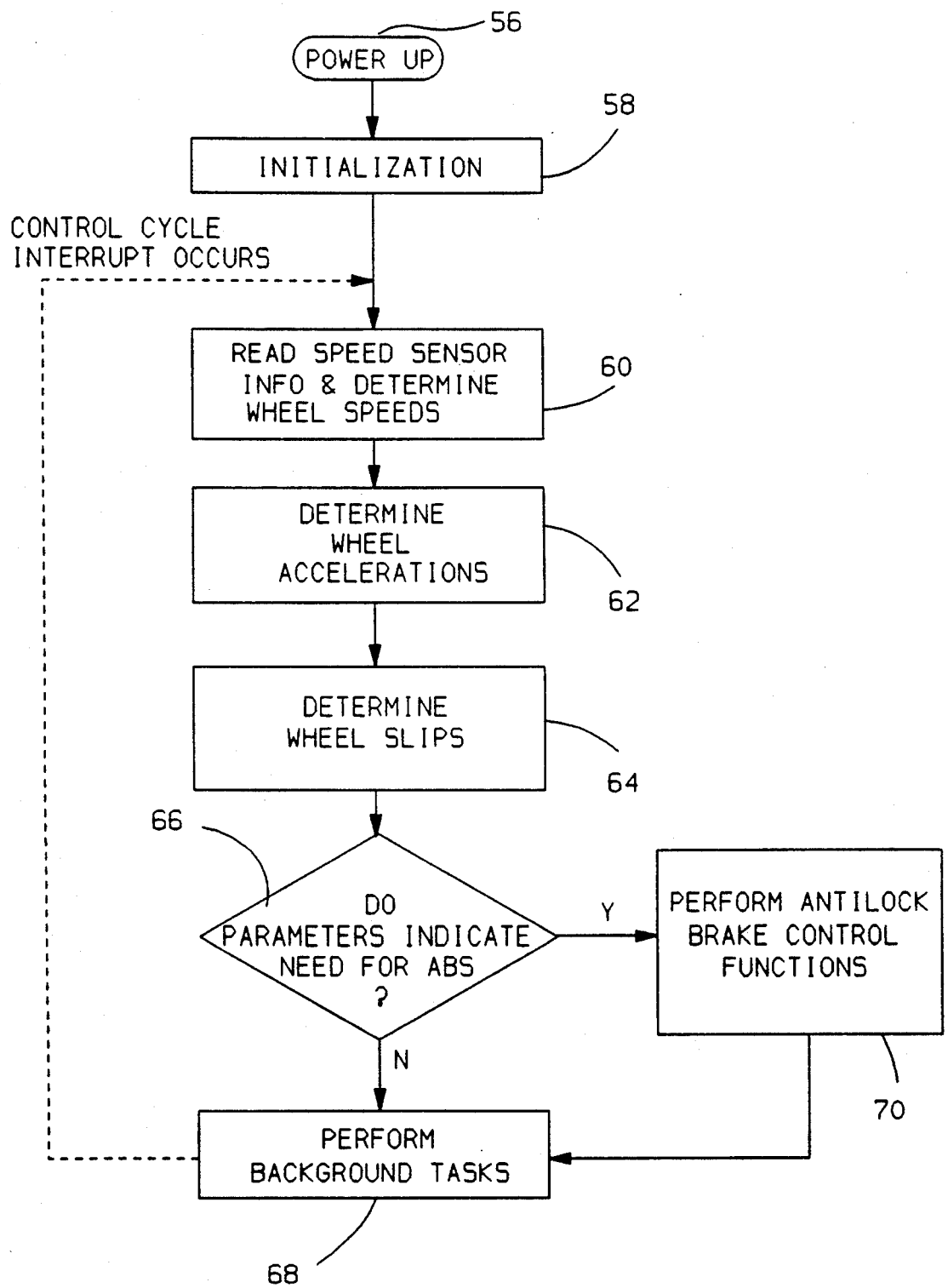
FIGS. 3 and 4 are flow diagrams illustrating the operation of the electronic controller of FIG. 1 in-accord with the principles of this invention.
Figure 4:
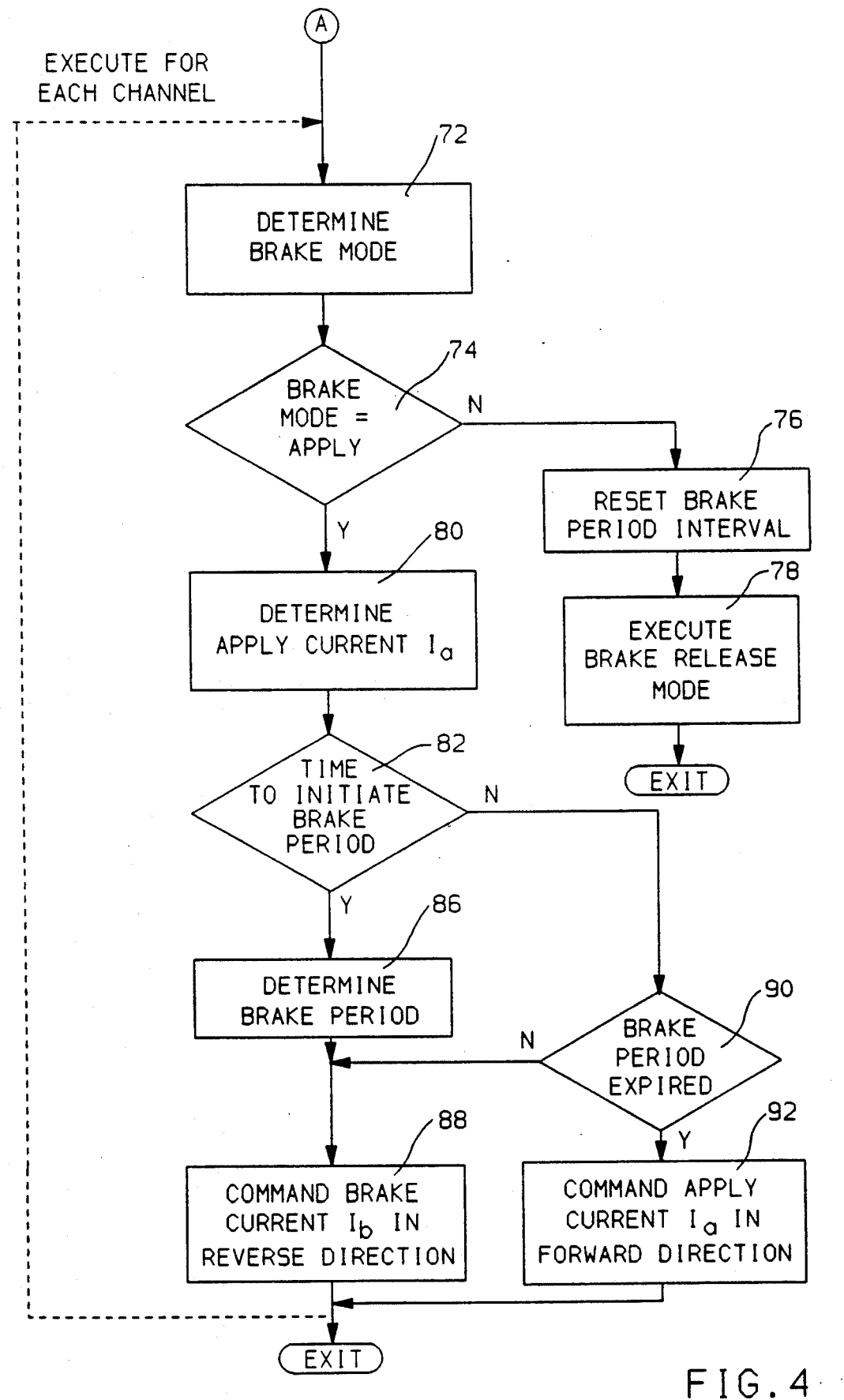

The operation of the electronic controller 28 in controlling the DC torque motor 30 in accord with this invention is illustrated in FIGS. 3 and 4. The read-only memory of the microprocessor 46 contains the instructions necessary to implement the algorithm as diagrammed in those figures.

Referring first to FIG. 3, when power is first applied to the system from a vehicle battery 54 (FIG. 1) such as when a conventional vehicle ignition switch (not illustrated) is rotated to its "on" position, the computer program is initiated at a point 56 and then provides for system initialization at step 58 which entails clearing registers, initializing various RAM variables to calibrated values and other functions. When the initialization routine is completed, the program then proceeds to perform antilock brake control functions as required. These antilock control functions are performed by executing a control cycle in response to each of repeated control cycle interrupts which are generated at predetermined fixed time intervals such as 5 milliseconds. Upon the occurrence of a control cycle interrupt, the digital computer begins executing the functions embodied in the control cycle. First, at step 60, wheel speed sensor information is read and wheel speed is computed for each of the vehicle wheels. Thereafter, the routine determines the individual wheel accelerations at step 62 and the individual wheel slip values at step 64. From the computed values of wheel acceleration and wheel slip, the program determines at step 66 whether or not those parameters represent the need for antilock brake pressure modulation for any wheel.

If antilock control of wheel brake pressure is not required, the program proceeds to perform background tasks at step 68. These tasks may include diagnostic functions as well as other functions. However, if step 66 determines that a need for antilock brake pressure modulation for any wheel is required, the program proceeds to a step 70 where antilock brake control functions are executed. Once those functions are executed, the program proceeds to the step 68 previously described.

The foregoing steps 60 thru 70 are repeated once for each control cycle. Thus, when a control cycle interrupt occurs, a new cycle begins at step 60 and the functions represented by steps 60 thru 70 are again repeated as previously described.

Repeated executions of step 70 when antilock brake control is required establishes the following brake cycle. When the wheel slip and acceleration conditions represent an incipient wheel lockup condition, a pressure release mode is indicated and brake pressure is quickly released to allow the wheel to recover from the incipient wheel lockup condition. When wheel acceleration and slip conditions represent a recovered condition, an apply mode is indicated and wheel pressure is reapplied, such as to a significant fraction of the wheel pressure at the time pressure was released, and thereafter ramped until another incipient wheel lockup condition is sensed at which time the release mode is indicated and the cycle is repeated. In the form of control to which this invention relates, the control of the brake pressure is established via control of the current through the DC torque motor 30. Accordingly, brake pressure is released in response to a detected incipient wheel lock condition by controlling current through the DC motor 30 in a reverse direction and pressure is applied by controlling the current through the motor 30 in a forward direction. During brake pressure application, the current is ramped at a controlled rate with intermittent dynamic braking periods to limit the motor speed and to provide the desired linear relationship of the ramping of the brake pressure.

Referring to FIG. 4, there is illustrated the antilock brake control functions executed once for each braking channel where each channel includes a modulator 18. Where the four wheels of the vehicle are controlled independently, this requires the routine of FIG. 4 to be executed four times, once for each wheel with its related parameters. In another system, the rear brakes may be controlled by a single modulator such that the routine of FIG. 4 then is executed once for each front wheel and once for the combined rear wheels.

The antilock brake control routine begins with a step 72 that determines the required apply or release brake mode. In general, the apply or release brake mode is determined based upon the conditions of wheel acceleration and wheel slip. In this embodiment, the brake mode is determined by a lookup table stored in ROM establishing the threshold between pressure apply and release modes as a function of wheel acceleration and wheel slip. When the combination of wheel acceleration and wheel slip represents an incipient wheel lockup condition, the lookup table indicates a brake release mode whereas if the combination of wheel acceleration and wheel slip represents a recovered condition, the lookup table indicates a brake apply mode.

Step 74 then determines whether the brake mode determined at step 72 is an apply mode. If not, indicating a release mode in response to an incipient lockup condition, the program proceeds to a step 76 where the duration of a dynamic motor brake period interval is reset. In this embodiment, the motor brake period interval is a constant interval representing the frequency at which the DC torque motor 30 is dynamically braked. From step 76, the program executes a brake release mode at step 78. In the preferred embodiment, when an incipient wheel lockup condition is first detected, step 78 stores the commanded motor current as representative of the motor current at the time the incipient wheel lockup condition is detected. This stored current value represents a measure of the brake pressure producing the maximum brake effort that corresponds to the wheel critical slip. Thereafter with repeated executions of step 78 for the respective wheel, step 78 releases the brake pressure by commanding a release current $I_r$ in a reverse direction. In one embodiment, steps 72 and 78 can also provide for a hold mode wherein the brake pressure is held at a constant value when the wheel slip and acceleration represent the wheel beginning to recover from the incipient wheel lockup condition.

Release of brake pressure in response to repeated execution of the steps 72 through 78 results in the wheel recovering from the incipient lock condition. This recovery condition is detected at step 72 when the lookup table indicates a pressure apply mode for the wheel acceleration and wheel slip conditions. When step 74 determines that step 72 has determined a pressure apply mode, the program then proceeds to a step 80 where the apply current $I_a$ for reapplying brake pressure is determined. In the preferred mode, the apply current is first set to a significant fraction of the current stored in step 78 when the incipient lockup condition was first detected. Thereafter, upon repeated executions of the step 80, the apply current $I_a$ is ramped at a controlled rate to increase the brake pressure at the wheel brake 20 until an incipient wheel lock condition is again sensed at step 72 wherein a brake release mode is then again indicated at which time the cycle is repeated. In this embodiment, the ramp rate of the motor apply current $I_a$ for increasing the brake pressure during the brake apply mode is a function of wheel slip and wheel acceleration. In general, this ramp rate is decreased with increasing wheel slip and wheel deceleration results in a lower ramp rate as the wheel approaches an incipient wheel lock condition.

To limit the speed of the torque motor 30 and to provide a linear relationship between the pressure ramp rate and the current ramp rate, the subject invention provides for periodic dynamic braking of the DC torque motor as the current is ramped to provide for ramping of the pressure. By preventing excessive motor speed, the overshoot of the pressure at the time an incipient wheel lockup condition is sensed is minimized and the motor current value stored in step 78 when the incipient wheel lockup condition was first sensed will be representative of the actual brake pressure existing at that time which corresponds to the pressure producing the critical slip between the wheel and the road surface.

The periodic braking of the DC motor is provided at constant intervals. The program determines whether or not it is time to initiate dynamic braking at step 82. In one embodiment, this step indicates time to initiate a brake period at constant intervals of 55 milliseconds. Assuming it is time to initiate dynamic braking of the motor 30, the program proceeds to a step 86 where the duration of the dynamic braking is established. In general, the duration is inversely related to the ramp rate of the applied current and inversely related to the magnitude of the motor current. As previously described in regard to step 80, the controlled rate of increase of the apply current $I_a$ is established as a function of wheel acceleration and wheel slip. By establishing the dynamic brake period as an inverse relationship to the ramp rate, a larger brake period is provided when step 80 establishes a transition to a slower ramp rate. This increased brake period quickly reduces the speed of the motor associated with the higher ramp rate to the speed established by the lower ramp rate to thereby prevent the potential of an overshoot condition if the wheel parameters are in proximity to an incipient wheel lockup condition. The inverse relationship to the motor current provides a larger dynamic brake period at low current levels with a decrease in the brake period as the current level is ramped. This provides a linearization of the pressure ramp rate and limits the motor speed at the lower pressures at which the pressure ramp rate for a given current ramp rate is higher than at the higher pressures. The dynamic brake period is determined in the preferred embodiment via a lookup table in ROM addressed as a function of the ramp rate of the apply current determined at step 80 and the magnitude of the commanded apply current $I_a$. The lookup table stores the various dynamic brake periods associated with the particular combinations of current ramp rate and current level.

Following the determination of the brake period, the program proceeds to a step 88 which provides for dynamic braking of the torque motor 30. This is accomplished by commanding a reverse direction of the motor to the motor driver interface and commanding a brake current value $I_b$. In the preferred embodiment, the command current $I_b$ is zero so that the motor is set in the reverse direction with a zero command current. The effect of the foregoing is to establish dynamic braking in the motor to slow the speed of the torque motor 30.

Returning to step 82, if it is determined that it is not time to initiate a brake period, the program proceeds to a step 90 where it determines whether or not a previously initiated brake period has expired. If a brake period had previously been initiated but the duration established at step 86 has not expired, the program proceeds to step 88 where braking of the motor is continued. However, when the brake period expires, the program proceeds from step 90 to a step 92 where the normal apply current $I_a$ in the forward direction established via step 80 is commanded to the motor driver interface. When antilock braking is provided for all the brake channels as required, the program exits the antilock brake control function routine 70 and proceeds to perform the background task 68 illustrated in FIG. 3.

The effect of the foregoing is to recurrently interrupt the ramping of the motor current ramp to apply the brake current in the opposite direction for the determined brake period.

By providing for the periodic braking of the motor via the routine of FIG. 4 as described, the motor speed is limited so as to prevent an overshoot of the pressure required to establish the maximum braking condition occurring at the critical slip between the wheel and the road surface. Further, in the antilock brake control system wherein the motor current is stored upon the sensing of an incipient wheel lockup condition to establish a reference for re-application of brake pressure, the value stored is representative of the actual brake pressure occurring at the critical slip between the wheel and the road surface.

The foregoing description of a preferred embodiment of the invention for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. A method of controlling the wheel brake pressure applied to the brake of a vehicle wheel traveling over a road surface in a vehicle braking system having a pressure modulator including a motor for generating a motor torque in response to motor current to control the applied wheel brake pressure, the method comprising the steps of:
   sensing an incipient wheel lockup condition;
   controlling the motor current to release wheel brake pressure when an incipient wheel lockup condition is sensed to allow wheel recovery from the incipient wheel lockup condition;
   ramping the motor current following wheel recovery to increase the applied wheel brake pressure until an incipient wheel lockup is again sensed; and
   recurrently braking the motor while the motor current is ramped, the braking providing control of motor speed.

2. A method of controlling the wheel brake pressure applied to the brake of a vehicle wheel traveling over a road surface in a vehicle braking system having a pressure modulator including a motor for generating a motor torque in response to motor current to control the applied wheel brake pressure, the method comprising the steps of:
   sensing an incipient wheel lockup condition;
   controlling the motor current to release wheel brake pressure when an incipient wheel lockup condition is sensed to allow wheel recovery from the incipient wheel lockup condition;
   ramping the motor current following wheel recovery in direction to increase wheel brake pressure and at a ramp rate varying in a predetermined relationship to a braking condition; and
   braking the motor for a brake period during each of recurrent intervals while the motor current is ramped to increase wheel brake pressure.

3. The method of claim 2 wherein the brake period is varied in an inverse relationship to the ramp rate of the motor current.

4. The method of claim 2 wherein the brake period is varied in an inverse relationship to the value of motor current.

5. The method of claim 3 or 4 wherein the braking condition includes wheel slip and the predetermined relationship is an inverse relationship to wheel slip value.

6. The method of claim 3 or 4 wherein the braking condition includes wheel deceleration and the predetermined relationship is an inverse relationship to wheel deceleration value.

7. A method of controlling the wheel brake pressure applied to the brake of a vehicle wheel traveling over a road surface in a vehicle braking system having a pressure modulator including a motor for generating a motor torque in response to motor current to control the applied wheel brake pressure, the method comprising the steps of:
   sensing an incipient wheel lockup condition;
   controlling the motor current in a first direction through the motor to control the motor to release wheel brake pressure when an incipient wheel lockup condition is sensed to allow wheel recovery from the incipient wheel lockup condition;
   ramping the motor current in a second direction through the motor opposite the first direction following wheel recovery to control the motor to increase the applied wheel brake pressure until an incipient wheel lockup is again sensed; and
   interrupting the ramped motor current and establishing the motor current in the first direction through the motor at a predetermined brake current value for a predetermined brake period at recurrent intervals.

8. The method of claim 7 wherein the brake current value is zero. s n 4s n

* * * * *